March 22, 1938. W. R. COOL 2,112,014
AUXILIARY POWER PLANT FOR AIRCRAFT
Filed June 20, 1935
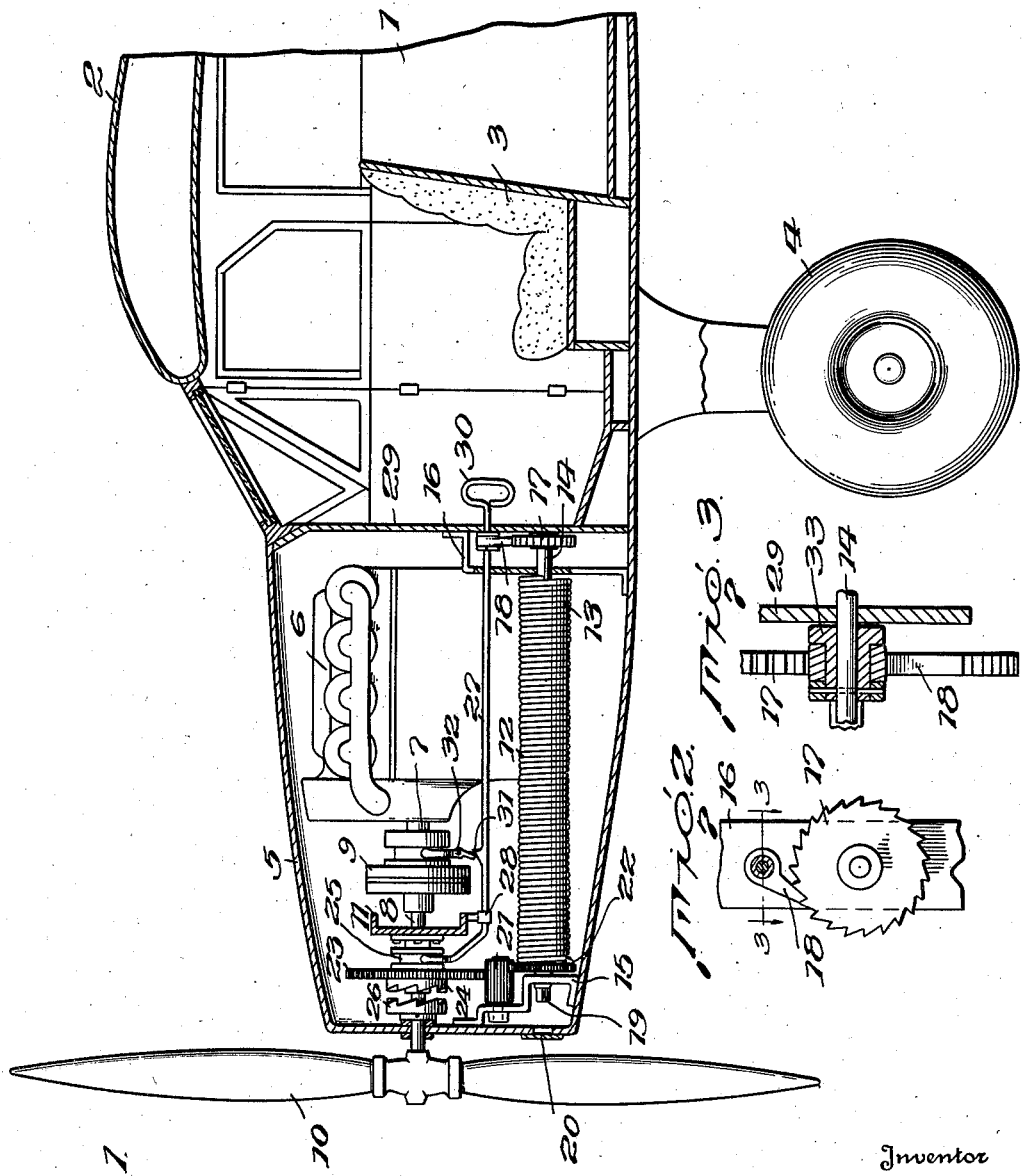
Inventor
William Randolph Cool,
By Lee L. Townshend
Attorney Patented Mar. 22, 1938

2,112,014

UNITED STATES PATENT OFFICE 2,112,014

AUXILIARY POWER PLANT FOR AIRCRAFT

William Randolph Cool, Coraopolis, Pa., assignor to W. T. Tredway, trustee

Application June 20, 1935, Serial No. 27,595

1 Claim. (Cl. 244—58)

This invention relates to improvements in aircraft, and the primary object of the invention is to provide a safety factor for power driven aircraft in the nature of an attachment that gives a short, auxiliary, flying range in event of failure of the power plant.

Another object of the invention is to provide an airplane with an auxiliary power plant that may be utilized to propel the airplane in event of failure of the main power plant.

Still another object of the invention is to provide an airplane with an auxiliary power plant comprising a spring motor containing sufficient stored mechanical energy to propel the airplane a limited distance.

A further object of the invention is to provide an airplane with a main power plant and an auxiliary power plant and a mechanism to disconnect the main power plant in event of failure thereof and connect the auxiliary power plant.

Other objects will be apparent, from the description, to those skilled in the art. The present disclosure constitutes an exposition of an embodiment of the invention, and illustrates the best means I have thus far devised for reducing the invention to practice. It is to be understood that the structural details shown and described shall not constitute limitations inconsistent with the scope of the invention as claimed.

In the drawing:

Figure 1 is a partial vertical section of the front portion of an airplane showing my invention applied thereto.

Figure 2 is a fragmentary elevation of the lock for the spring motor.

Figure 3 is a section on the line 3—3 of Figure 2.

In power driven aircraft one of the chief reasons for accidents is the failure of the power plant. Even under favorable conditions of terrain and weather, in the event of such an occurrence the safety factor is dependent upon the altitude. At other critical periods of flight the failure of the power plant usually results in a "crack-up" of the aircraft. I propose to overcome this hazard as far as possible by providing an auxiliary power plant in the nature of a spring motor that is capable of propelling the aircraft a limited distance so as to enable the pilot to select a suitable emergency landing site, or provide temporary propulsion at a critical period.

In the form of the invention shown, 1 indicates the front portion of an airplane having a wing structure 2, pilot seat 3, landing gear 4, and hood 5. Within the hood is mounted the main power plant usually comprising an internal combustion engine 6. A power shaft 7 is connected to a driven shaft 8 by the usual clutch 9, and extends through the front of the hood 5, carrying on its outer end the usual propeller 10 that is the propelling means for the airplane. A cross strut 11 tends to support the driven shaft 7. This is conventional construction and forms no part of my improvement.

The auxiliary power plant comprises a spring motor 12 mounted within the hood 5, adjacent the engine 6. The spring motor comprises the usual spiral spring 13, mounted on a center shaft 14, extending parallel with the drive shaft 7, and terminating further forward in the hood adjacent the nose portion of the airplane.

The shaft 14 is mounted in a front bracket 15 and a rear bracket 16. A ratchet wheel 17 and locking pawl 18, at the rear end of the shaft, hold the motor under tension when wound. The front end of the shaft is flat sided, as shown at 19, for the reception of cranking means, not shown, insertable through an opening in the nose portion of the hood, normally covered by a plate 20, to wind the motor when necessary.

The spring motor is capable of operative connection with the driven shaft 8 through the medium of a long pinion 21 mounted in a stub shaft on the bracket 15 and meshing with a gear 22 adjacent the front end of the spring motor shaft 14. The pinion 21 also meshes with a gear 23 slidably mounted on the driven shaft 8 and carrying a clutch face 24 at the front side thereof and a clutch collar 25 at the rear side thereof. A cooperating clutch face 26 is rigidly connected to the shaft 8. Upon engagement of the clutch faces by a means to be hereinafter described, a driving connection between the spring motor and driven shaft is provided, and consequently the propeller 10 may be driven by the spring motor.

To provide a means for disengaging the main power plant and simultaneously engaging the auxiliary power plant I provide an operating rod 27, extending parallel with the spring motor shaft 14 and capable of manual longitudinal movement. The front of said rod is supported by a hanger 28 dependent from the cross strut 11, and its rear portion extends through the bracket 16 and partition 29, terminating in a handle portion 30. The front end of said rod has a forked engagement with the clutch collar 25. An inclined faced nib 31 is cooperatively engaged with a pivoted fork 32 of the collar on the clutch 9. The pawl 18 is also mounted on said rod through the medium of a two-part connected collar 33, as best illustrated in Figure 3.

It is apparent that with the parts disposed as shown in Figure 1 the airplane is propelled by the main power plant or engine 6, drive shaft 7, normally engaged clutch 9, driven shaft 8 and propeller 10. The spring motor is wound but held inoperative by the locking pawl 18, and as the clutch faces 24 and 26 are disengaged there is no connection to the driven shaft 8.

Should for any reason the main power plant or engine 6 fail to function, the pilot merely has to grasp the handle 30 of the rod 27 and push the same forward. This simultaneously engages the clutch faces 24 and 26, disengages the main power clutch 9, and releases the pawl 18 from the ratchet wheel 17. The auxiliary power plant then functions by action of the spring 13 rotating the shaft 14 and, through the gear train 22, 21 and 23 and clutch faces 24 and 26, power is transmitted to the shaft 8 to drive the propeller 10. At the same time the retarding action of the dead engine 6 is relieved by the operation of the clutch 9 to disconnect the shafts 7 and 8.

The auxiliary spring motor 12 is of sufficient strength to store enough mechanical energy to drive the propeller to give the airplane a limited flying range in the event of the failure of the main power plant. The spring motor structure may be relatively light as it is not contemplated that the auxiliary power plant will furnish energy for sustained flight but merely to give the pilot power control of the airplane in an emergency of the character outlined.

I claim:

In an airplane, a propeller, a propeller shaft, a main power plant for normally driving the same, an auxiliary power plant including a wound spring motor having a ratchet wheel, means for simultaneously disconnecting the main power plant from the propeller shaft and connecting the auxiliary power plant thereto, said means including a manually operable shaft, and a locking pawl on said shaft normally engaging the ratchet wheel of the spring motor and releasable therefrom upon operation of the shaft to immediately place the auxiliary power plant in operation.

WILLIAM RANDOLPH COOL.